(12) United States Patent
Krawczyk et al.

(10) Patent No.: US 8,881,877 B2
(45) Date of Patent: Nov. 11, 2014

(54) VIBRATION DAMPER

(75) Inventors: Anton Krawczyk, Windeck (DE);
Guido Holtmann, Windeck (DE); Heinz Sydekum, Dittelbrunn (DE); Uwe Herrmann, Wuerzburg (DE); Rudolf Schulte, Hennef (DE); Jörg Rösseler, Ruppichteroth/Winterscheid (DE); Ingo Gelhausen, Fuerthen (DE); Volker-Oliver Hupperich, Sankt Augustin (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 13/115,412

(22) Filed: May 25, 2011

(65) Prior Publication Data

US 2011/0290605 A1    Dec. 1, 2011

(30) Foreign Application Priority Data

May 25, 2010    (DE) .......................... 10 2010 029 252

(51) Int. Cl.
*F16F 9/00*    (2006.01)
*F16F 9/32*    (2006.01)

(52) U.S. Cl.
CPC .................... *F16F 9/3228* (2013.01)
USPC ...................................................... 188/322.22

(58) Field of Classification Search
USPC ............ 188/322.22, 321.11, 322.18; 92/255, 92/256, 257, 258, 259; 403/343, 348, 350, 403/374.1
See application file for complete search history.

(56) References Cited

U.S. PATENT DOCUMENTS

| 3,255,678 A | 6/1966 | Ottestad | |
| 3,885,461 A * | 5/1975 | Crisp et al. | ...................... 92/258 |
| 4,089,253 A | 5/1978 | Visser | |
| 4,917,003 A | 4/1990 | Kollross | |
| 7,322,273 B2 * | 1/2008 | Rafn | ............................... 92/256 |

FOREIGN PATENT DOCUMENTS

| DE | 3429473 | 2/1986 |
| DE | 3716819 | 12/1987 |
| DE | 10161801 | 8/2002 |
| DE | 102009002616 | 1/2011 |
| JP | 2009168137 | 7/2009 |

* cited by examiner

*Primary Examiner* — Robert A Siconolfi
*Assistant Examiner* — Vu Q Nguyen
(74) *Attorney, Agent, or Firm* — Cozen O'Connor

(57) ABSTRACT

A vibration damper includes a cylinder in which a piston fastened to a piston rod executes a translational and a rotational movement relative to the cylinder. The piston is fixed to the piston rod by an axial fastener, and a device for preventing rotation by positive engagement is formed between the piston and the piston rod.

13 Claims, 2 Drawing Sheets

VIBRATION DAMPER

BACKGROUND OF THE INVENTION

1. Field of the Invention

The invention is directed to a Vibration damper comprising a cylinder in which a piston fastened to a piston rod executes a translational and a rotational movement relative to the cylinder.

2. Description of the Related Art

In a vibration damper, the piston executes an axial relative movement relative to the cylinder. As a rule, a piston nut causes a pre-loading between the piston and the piston rod so that the connection between the piston and piston rod is not loosened.

Particularly in vibration dampers on articulated axles, the piston, together with the piston rod, also carries out a rotational relative movement relative to the cylinder. The piston can also execute a rotational relative movement relative to the cylinder in vibration dampers arranged at an inclination to the swiveling axis of an axle part. In this way, it can come about that the friction force between the inner wall of the cylinder and the piston exerts a loosening torque on the piston nut.

Particularly in vibration dampers for upscale vehicle types, bearings are provided which allow a relative movement of the piston rod relative to the vehicle body, as is disclosed in DE 37 16 819 A1, for example. The problem of loosening of the piston does not arise in vibration dampers of this kind.

As an alternative measure, for example, piston nuts are used whose thread pitch diverges slightly from a fastening thread of the piston rod. In this connection, reference is had to DE 34 29 473 A1, for example.

DE 101 61 801 A1 suggests a deliberate deformation of the piston nut as a solution for securing the piston. Further, self-locking nuts are also known.

In principle, the problem of loosening described above arises not only when pistons are secured by screwing, but also in pistons that are riveted to the piston rod. The method for fastening the piston to the piston rod is secondary, since every rotational movement of the piston relative to the piston rod shortens the life of the vibration damper.

SUMMARY OF THE INVENTION it is an object of the present invention to provide another solution for the problem of securing the piston.

According to one embodiment of the invention, a device for preventing rotation by positive engagement is formed between the piston and the piston rod.

The great advantage is that a rotational movement of the piston relative to the piston rod is reliably prevented. On the other hand, the axial pre-loading force on the piston can be reduced. As a result, smaller piston nut diameters can be used.

The device for preventing rotation is formed by a through-opening in the piston and a lateral surface of the piston rod so that no additional structural component parts need be used for the device for preventing rotation.

In principle, the positive-engagement connection between the piston and the piston rod can be produced by a profile of optional geometry. However, the lateral surface and the through-opening are preferably constructed as a multi-wedge profile.

To simplify assembly, the multi-wedge profile of the piston rod is constructed so as to be in an integer ratio to the multi-wedge profile in the region of the through-opening of the piston. The quantity of possible assembly positions of the piston on the piston rod is appreciably increased by this step so that assembly times are shortened.

In a further construction, the rotation-preventing profile is limited to only one axial portion of the through-opening.

Further, it is provided that the through-opening in the piston has an axial guide portion and a portion for the rotation-preventing profile, an assembly bevel being formed between these two portions. Owing to the assembly bevel, the piston also executes a slight rotational movement automatically when imprecisely guided onto the piston rod and, consequently, the positive engagement connection is closed.

The guide portion has a greater diameter than the rotation-preventing profile. The rotation-preventing profile need only support a turning torque. Transverse forces acting on the piston, which are appreciably larger, are taken over by the guide portion.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described more fully with reference to the following description of the drawings. In the drawings.

DETAILED DESCRIPTION OF THE PRESENTLY PREFERRED EMBODIMENTS

Figure 1:
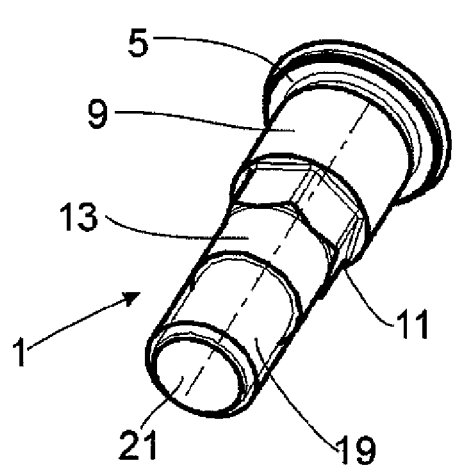
FIG. 1 is a partial view of a piston rod.
Figure 4:
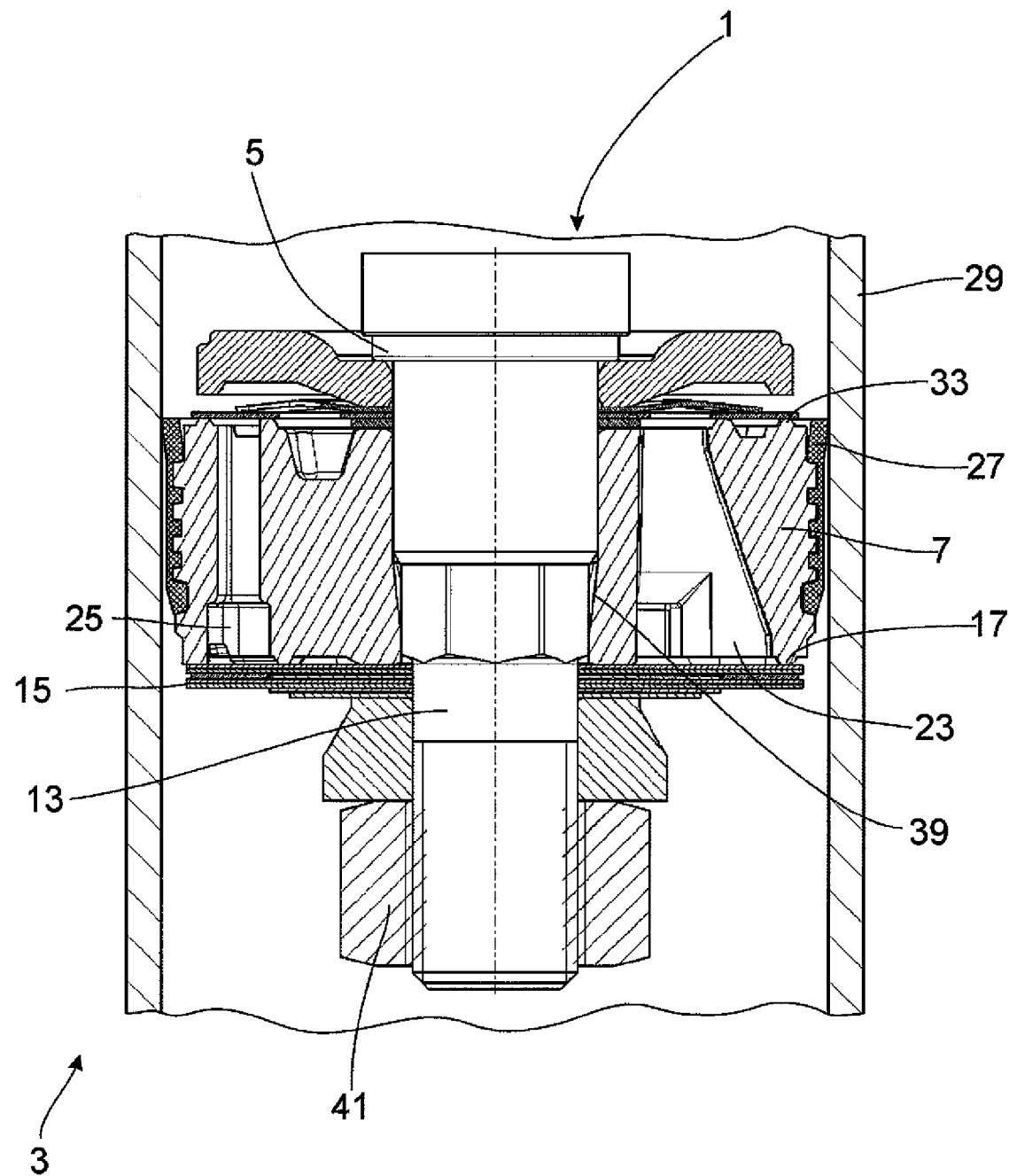
FIG. 4 is a partial section of a vibration damper.

FIG. 1 shows a portion of a piston rod for a vibration damper shown in FIG. 4 of optional construction. The piston rod 1 has an axially acting abutment collar for a piston 7 according to FIG. 2. The piston rod 1 has, axially in series with abutment collar 5, a guide portion 9 having a constant diameter. Following on a lateral surface of the piston rod 1 is a rotation-preventing profile 11 constructed as a multi-wedge profile shorter than the guide portion 9. A centering portion 13 adjoining the multi-wedge profile 11 serves for the radial positioning of at least one valve disk 15 (FIG. 4) on a first cover surface 17 of the piston 7 according to FIG. 2. A threaded portion 19 extends from the centering portion 13 to an end face 21 of the piston rod 1.

Figure 2:
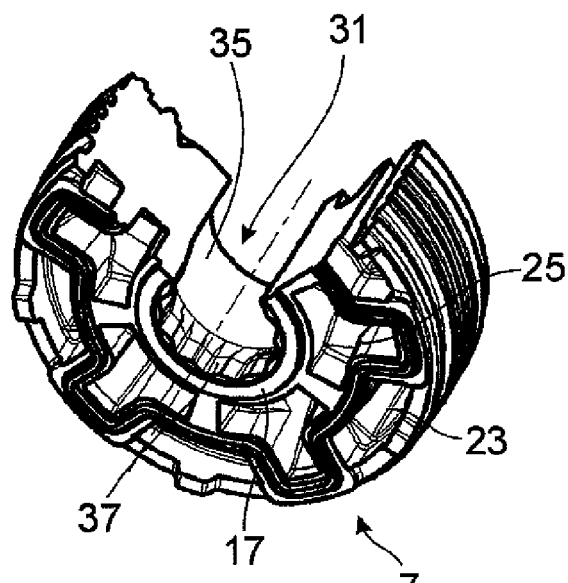
FIG. 2 is a piston as separate part.

FIG. 2 shows a piston 7 for the vibration damper 1 as a separate part. The shape of through-channels 23 and 25 in the piston 7 is not relevant to the invention. A piston ring 27, shown in FIG. 4, in frictional contact with an inner wall of a cylinder 29 of the vibration damper 3 is fixed on an outer circumferential surface. Also, a frictional force occurs under optimal friction conditions between the two friction partners.

The piston 7 has an axial through-opening 31 for receiving the piston rod 1 according to FIG. 1. A guide portion 35 which centers itself on guide portion 9 of the piston rod 1 extends from a second cover side 33 which faces in direction of the abutment collar 5 in the assembled state, as is shown in FIG. 4. At the end of the through-opening 31 in direction of the first cover side 17 of the piston 7, the through-opening 31 in the piston 7 has a rotation-preventing profile 37, likewise constructed as a multi-wedge profile, on an axial portion. The guide portion 35 of the through-opening 31 has a greater diameter than the multi-wedge profile 37. An assembly bevel 39 is formed between the guide portion 35 and the multi-wedge profile 37 inside the through-opening 31. Vibrations occurring during assembly already suffice to allow the multi-wedge profiles 11, 37 at the piston 7 and at the piston rod 1 to engage one inside the other by way of the assembly bevels 39.

When viewed in combination, FIGS. 1 and 2 show that multi-wedge profile 11 of the piston rod 7 has fewer profile faces than multi-wedge profile 37 inside the through-opening 31. In a specific instance, the multi-wedge profile 11 of the piston rod 1 is constructed with six wedges and the multi-wedge profile 37 of the through-opening 31 is constructed with twelve wedges, i.e., multi-wedge profile 11 of piston rod 1 is in an integer ratio to multi-wedge profile 37 of piston 7.

Figure 3:
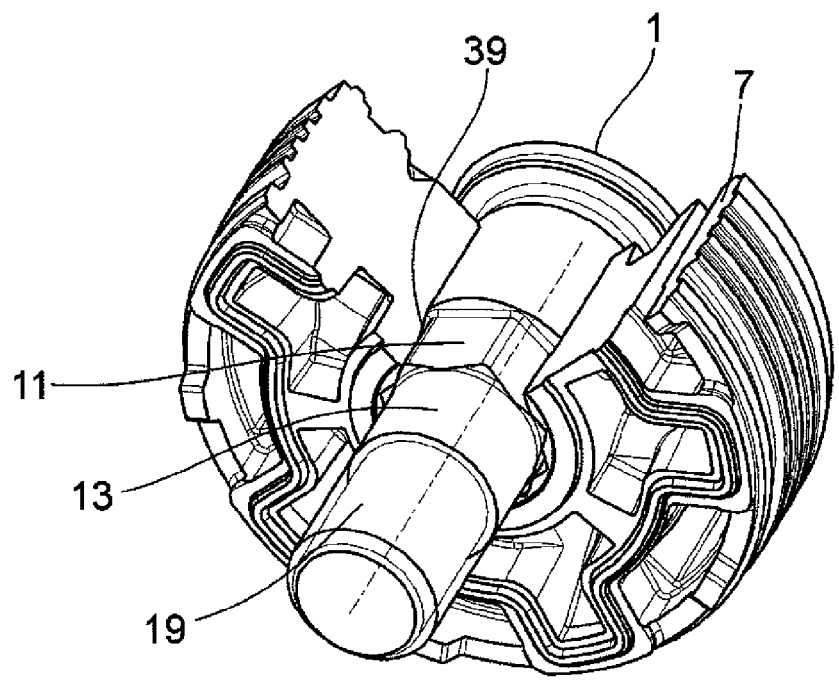
FIG. 3 is a piston rod-piston assembly unit.

FIG. 3 shows the constructional unit comprising piston rod 1 and piston 7, wherein the two multi-wedge profiles 11, 37 of the piston rod 1 and of the piston 7 are in a positive engagement with one another so that the through-opening 31 in the piston 7 and the lateral surface of the piston rod 1 form a device for preventing rotation. This prevention of rotation is generated independently from a pre-loading, e.g., of a piston nut 41 (FIG. 4) on the threaded portion 19.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A vibration damper comprising:
   a piston defining a through-opening;
   a piston rod having a lateral surface formed in one-piece with the piston rod, the lateral surface being received within the through-opening;
   a cylinder in which the piston executes translational and rotational movement relative to the cylinder; and
   an axial fastener fastening the piston to the piston rod;
   wherein the lateral surface of the piston rod and the through-opening of the piston define first and second multi-wedge profiles, respectively, and the first and second multi-wedge profiles each comprise respective first and second rotation-preventing flat faces, the first and second flat faces being configured to engage in positive engagement by relative axial movement between the piston rod and the through-opening, to prevent rotation between the piston rod and the piston.

2. The vibration damper according to claim 1, wherein:
   the first multi-wedge profile of the lateral surface comprises a first number of flat faces;
   the second multi-wedge profile of the through-opening comprises a second number of flat faces; and
   the ratio between the second number of flat faces and the first number of flat faces is an integer.

3. The vibration damper of claim 2, wherein the ratio is an integer greater than 1.

4. The vibration damper according to claim 1, wherein the second multi-wedge profile is limited to a first axial portion of the through-opening.

5. The vibration damper according to claim 4, wherein the through-opening in the piston has a second, axial guide portion, and an assembly bevel between the first axial portion and the second, axial guide portion.

6. The vibration damper according to claim 5, wherein the second, axial guide portion has a greater diameter than the first axial portion.

7. The vibration damper of claim 1, wherein:
   a first portion of the lateral surface is configured to engage the through-opening; and
   a second portion of the lateral surface defines a threaded portion separate from and in series with the first portion.

8. The vibration damper of claim 1, wherein the first and second flat surfaces are configured to engage in positive engagement to prevent rotation without additional structural components for preventing rotation.

9. The vibration damper according to claim 1, wherein the first and second flat faces extend axially.

10. The vibration damper according to claim 1, wherein the first and second flat faces are perpendicular to a longitudinal axis of the piston rod.

11. A vibration damper comprising:
    a piston defining a through-opening;
    a piston rod received within the through-opening;
    a cylinder in which the piston executes translational and rotational movement relative to the cylinder;
    an axial fastener fastening the piston to the piston rod;
    a first multi-wedge profile formed in one-piece with the piston, within the through-opening, the first multi-wedge profile comprising a first plurality of axially extending, inwardly facing flat faces perpendicular to a longitudinal axis of the piston rod; and
    a second multi-wedge profile formed in one-piece with the piston rod, the second multi-wedge profile comprising a second plurality of axially extending, outwardly facing flat faces perpendicular to the longitudinal axis of the piston rod;
    wherein the first and second axially extending flat faces engage to prevent rotation of the piston with respect to the piston rod by positive engagement with each other.

12. The vibration damper of claim 11, wherein the piston rod further comprises:
    a threaded portion at an end of the piston rod, separate from the second, multi-wedge profile.

13. The vibration damper of claim 12, wherein the threaded portion is outside of the through-opening, and the axial fastener comprises:
    a locking nut to engage the threaded portion, wherein rotation prevention is not provided by the locking nut.

* * * * *